United States Patent
Choi et al.

(10) Patent No.: US 6,317,606 B1
(45) Date of Patent: Nov. 13, 2001

(54) METHOD FOR PROCESSING STATISTICS DATA IN MOBILE STATION IN MOBILE COMMUNICATION SYSTEM

(75) Inventors: Yong Su Choi, Kyungki-do; Su Hyun Park, Seoul, both of (KR)

(73) Assignee: LG Information & Communication, Ltd., Seoul (KR)

( * ) Notice: Subject to any disclaimer, the term of this patent is extended or adjusted under 35 U.S.C. 154(b) by 0 days.

(21) Appl. No.: 09/223,756

(22) Filed: Dec. 31, 1998

(30) Foreign Application Priority Data

Aug. 14, 1998 (KR) .................................................. 98-33369

(51) Int. Cl.[7] ...................................................... H04B 7/00
(52) U.S. Cl. ........................ 455/517; 455/412; 455/414; 455/507; 455/550; 455/575
(58) Field of Search ..................................... 455/412, 414, 455/426, 458, 517, 507, 550, 575, 466, 450, 564

(56) References Cited

U.S. PATENT DOCUMENTS 6,061,365 * 5/2000 Yeung et al. .
6,078,570 * 6/2000 Czaja et al. .
6,097,961 * 8/2000 Alanara et al. ....................... 455/466
6,151,514 * 11/2000 Cheng et al. .

\* cited by examiner

*Primary Examiner*—Curtis Kuntz
*Assistant Examiner*—Barry W Taylor
(74) *Attorney, Agent, or Firm*—Fleshner & Kim, LLP

(57) ABSTRACT

Method for processing a statistics data accumulated in a mobile station in a mobile communication system, wherein a base station checks presence of a request for processing the statistics data accumulated in the mobile station, classifies items of the statistics data into groups according to attributes and characteristics when the request presents, and composes a request message for processing the statistics data using the groups, which is transmitted to the mobile station.

17 Claims, 5 Drawing Sheets

METHOD FOR PROCESSING STATISTICS DATA IN MOBILE STATION IN MOBILE COMMUNICATION SYSTEM

BACKGROUND OF THE INVENTION

1. Field of the Invention

The present invention relates to a method for processing a statistics data in a mobile station in a mobile communication system, and more particularly, to a method for collecting or initializing a statistics data accumulated in a mobile station.

2. Background of Related Art

In general, the statistics data accumulated in the mobile station is collected or initialized through a traffic channel set up between a base station and the mobile station. These related arts are defined in communication standards, such as J-STD-008, IS-95A, IS-95B, TSB 74, and the like. FIG. 1 illustrates a block diagram showing a general CDMA mobile communication system. The CDMA mobile communication system is provided with a mobile station 1 for collecting, reporting on, and initializing a statistics data, and a base station 10 for determining items of the statistics data and requesting the mobile station 1 on reporting and initialization of the statistics data. The base station 10 is provided with a base transceiver subsystem(BTS) 3 with a traffic channel 2 and a base station controller (BSC) 5 with a selector/vocoder 4. According to the communication standards mentioned above, the base station 10 provides a retrieve parameters message to the mobile station 1 for requesting the statistics data accumulated in the mobile station 1. The base station provides a set parameters message to the mobile station 1 for initializing the statistics data accumulated in the mobile station 1. The base station 10 knows all the statistics data on in/out signals of the base station 10 collected by itself. However, the base station 10 does not know the statistics data in the mobile station 1. Therefore, in order to increase its own efficiency, the base station 10 has a necessity to know the statistics data in the mobile station 1. In the meantime, according to the existing communication standard IS-95B, the mobile station 1 has 129 accumulated statistics items each of which is identified with a parameter identification field(PARAMETER_ID). Therefore, the total number of the field(PARAMETER_ID) is currently 129 in IS-95B. Though the statistics items in the current IS-95B is 129, the number of items may be increased or decreased in the future, according to which the PARAMETER_ID may also be increased or decreased. The process of the BSC 5 for collecting the statistics data in the mobile station 1 will be explained.

The selector/vocoder mobile 4 in the BSC 5 determines items of the statistics data to be collected from the mobile station 1 and composes the retrieve parameters message defined in the communication standards. The retrieve parameters message should contain all the parameters identification field(PARAMETER_ID) falling on all the items intended to collect from the statistics data accumulated in the mobile station 1. As explained, it should be noted that the existing communication standard IS-95B has a 129 total number of items of the statistics data accumulated in the mobile station. The selector/vocoder mobile 4 in the BSC 5 provides the composed retrieve parameters message to the traffic channel 2 in the BTS 3. The traffic channel 2 in the BTS 3 is then provides the received message to the mobile station 1 in turn, and the mobile station 1, receiving the retrieve parameters message, collects items of the statistics data the message requires. Then, the mobile station 1 provides a response parameters message containing the items of the collected statistics data to the selector/vocoder mobile 4 in the BSC 5 through the traffic channel in the BTS 3. In this instance, the items of the statistics data the mobile station 1 collects are total 10 kinds of 129 items according to the IS-95B standard. Therefore, the parameters identification field(PARAMETER_ID) is also assigned each the 129 items. The process of the BSC 5 for initializing the items of the statistics data accumulated in the mobile station 1 will be explained.

The selector/vocoder mobile 4 in the BSC 5 first determines items to be initialized of the statistics data in the mobile station 1 which is in a traffic state, and then, composes a set parameters message to be provided to the mobile station 1. In this instance, the message should contain all parameters identification field(PARAMETER_ID) falling on all items to be initialized. The selector/vocoder mobile 4 in the BSC 5 provides the composed set parameters message to the mobile station 1 through the traffic channel 2 in the BTS 3. Then, the mobile station 1 receives the message and conducts initialization of the items required in the message.

As explained, according to technologies defined in existing communication standards, such as J-STD-008 and IS-95B, the retrieve parameters message and the set parameters message which are messages required by the base station 10 in collecting or initializing the items of the statistics data accumulated in the mobile station are composed item by item, i.e., for each parameter identification field(PARAMETER_ID). For example, when it is intended to collect a statistics data on a forward fundamental code channel for multiplex option 2 from the mobile station 1, a total number of items of the statistics data is 26. In order to provide the retrieve parameters message required by the base station from the base station 10 to the mobile station 1, the parameter identification field(PARAMETER_ID) on all the 26 items should be included in the message. On reception of the message, the mobile station 1 collects the statistics data on the forward fundamental code channel for multiplex option 2 and provides a response parameters message including the collected statistics data to the selector/vocoder mobile 4 in the BSC 5.

Thus, in order to process the statistics data in a mobile station 1 according to existing communication standards, all items of the statistics data should have been cited in the transmission message. However, the accumulated statistics are not needed on each field but needed on fields according to attributes or characteristics. On the other hand, the mobile communication system is required to reduce an amount of data to be transmitted through a traffic channel as far as possible for an increased efficiency. As above-mentioned, the related art has the following problems.

First, an excessive loading of messages related to collection and initialization of statistics data on a traffic channel may degrades a quality of voice signal. As above mentioned, in other words, the set parameters message and the retrieve parameters message are transmitted by the dim and burst method or the blank and burst of the traffic. Therefore the length of the traffic channel message takes effect to the voice quality and it is necessary to reduce the length of the traffic channel message.

Second, collection of items of the statistics data only item by item results in complicated implementation of a soft ware and a large sized message which is composed for collecting the items of the statistics data, that increases a load on an internal path of the base station.

Third, in a TIA/EIA-95-B, the mobile station shall maintain the counters to accumulated statics. In order to obtain the accumulated statistics, the base station may send the retrieve parameters message after entering the traffic channel initialization substate. Similarly, in order to initiate the accumulated statistics, the base station may send the set parameters message after entering the traffic channel initialization substate. The above-procedure can operate properly, but is not optimal because of following factors. The first one is that each field of the message is identified by the field (PARAMETER_ID). The second one is that the number of the field (PARAMETER_ID) is currently 129 in TIA/EIA-95-B. The third one is that the accumulated statistics are not needed for each field but are needed for fields as a group.

SUMMARY OF THE INVENTION

Accordingly, the present invention is directed to a method for processing a statistics data in a mobile station in a mobile communication system that substantially obviates one or more of the problems due to limitations and disadvantages of the related art.

An object of the present invention is to provide a method for processing a statistics data in a mobile station in a mobile communication system, which can reduce an amount of data to be transmitted through a traffic channel.

Other object of the present invention is to provide a method for processing a statistics data in a mobile communication system of an existing communication standard IS95-B with a backward compatibility.

Another object of the present invention is to provide a method for processing a statistics data in a mobile communication system, which can maintain a good voice quality even if a statistic data in a mobile station is under processing.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To accomplish the foregoing objects, the present invention includes the following concepts. As above mentioned, the field(PARAMETER_ID) defined from 1 to 129 in TIA/EIA-95-B. The present invention defines the value of the field(PARAMETER_ID) to "0" as existing of a parameter group identification field(PARA_GRP_ID) that indicates to group the fields (PARAMETER_ID) into the fields (PARA_GRP_ID) classified by attribute and characteristics. According to each type of accumulated statistics such as accumulated access channel statistics, accumulated reverse traffic channel statistics for each multiplex option, accumulated paging channel statistics, accumulated layer 2 statistics, the field(PARA_GROUP_ID) is defined in order to optimize fields of a message. A base station may send a retrieve parameters message and a set parameters message to a mobile station with the field(PARA_GROUP_ID). In order to provide a backward compatibility with TIA/EIA-95-B, the field(PARAMETER_ID) may be used in the retrieve parameters message and the set parameters message. It depends on the value of a first occurrence field (PARAMETER_ID) in each message. If the value of the first occurrence field(PARAMETER_ID) is "0", the accumulated statistics are indexed by the field(PARA_GROUP_ID). Otherwise, the accumulated statistics are indexed by the field(PARAMETER_ID) similarly to TIA/EIA-95-B.

To achieve these and other advantages and in accordance with the purpose of the present invention, as embodied and broadly described, the method for processing a statistics data accumulated in a mobile station in a mobile communication system, includes for a base station to check presence of a request for processing the statistics data accumulated in the mobile station, classify items of the statistics data into groups according to attributes and characteristics when the request presents, and compose a request message for processing the statistics data using the groups, which is transmitted to the mobile station.

In other aspect of the present invention, upon reception of a request message for processing a statistics data accumulated in the mobile station from a base station, the mobile station analyzes the request message. If a parameter identification field(PARAMETER_ID) with a value of "0", a number of parameter (group identification field(NUM_OF_PARA_GRP_ID), and a parameter group identification field(PARA_GROUP_ID) are present in the request message as a result of the analyzation, the statistics data is processed group by group according to the request message using fields, and, if the fields are not present, the statistics data are processed item by item. And, the mobile station transmits a response parameters message corresponding to a result of the processing to the base station.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings. A method for processing a statistics data in a mobile communication system of the present invention will be explained with reference to FIG. 1 which illustrates a general CDMA mobile communication system.

Figure 1:
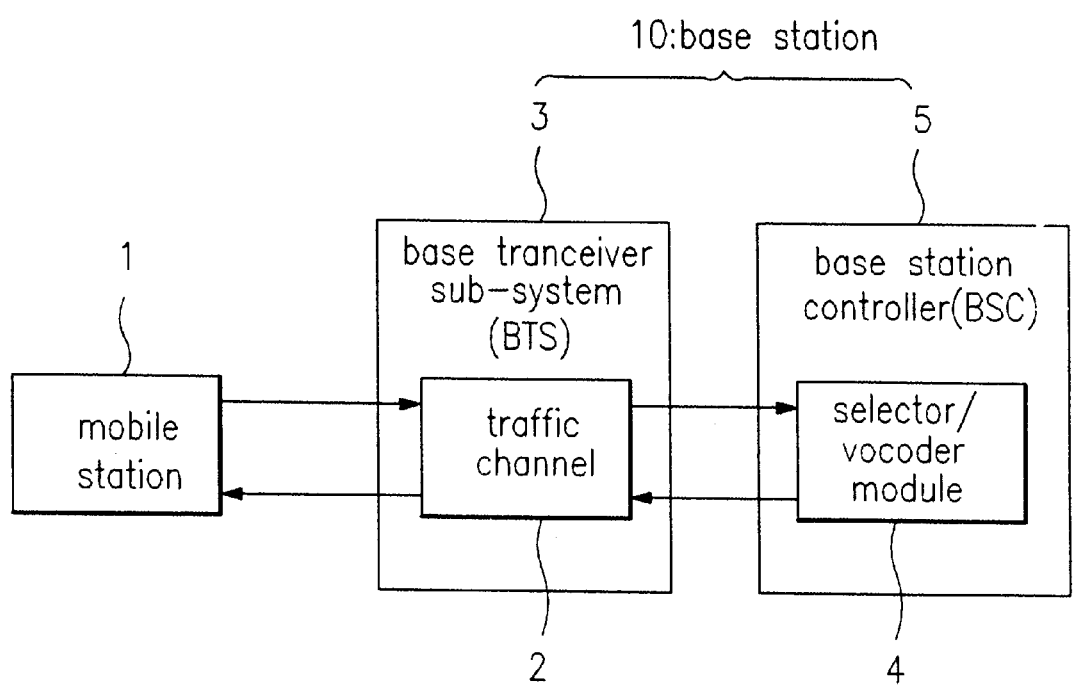
FIG. 1 illustrates a block diagram showing a general CDMA mobile communication system.

Referring to FIG. 1, a mobile station 1 collects a statistics data, reports to a base station 10, and initializes the statistics data. A BTS(base transceiver subsystem) 3 includes a traffic channel 2, and a BSC(base station controller) 5 includes a selector/vocoder module 4. The selector/vocoder mobile 4 determines on items of the statistics data in the mobile station, and reports the determined statistics items to the mobile station or requests the mobile station to initialize the determined statistics data. The traffic channel 3 transmits the statistics request from the selector/vocoder mobile 4 to the mobile station 1. As shown in FIG. 1, the BTS 3 and the BSC 5 are collectively called as a base station(BS) 10.

Figure 2:
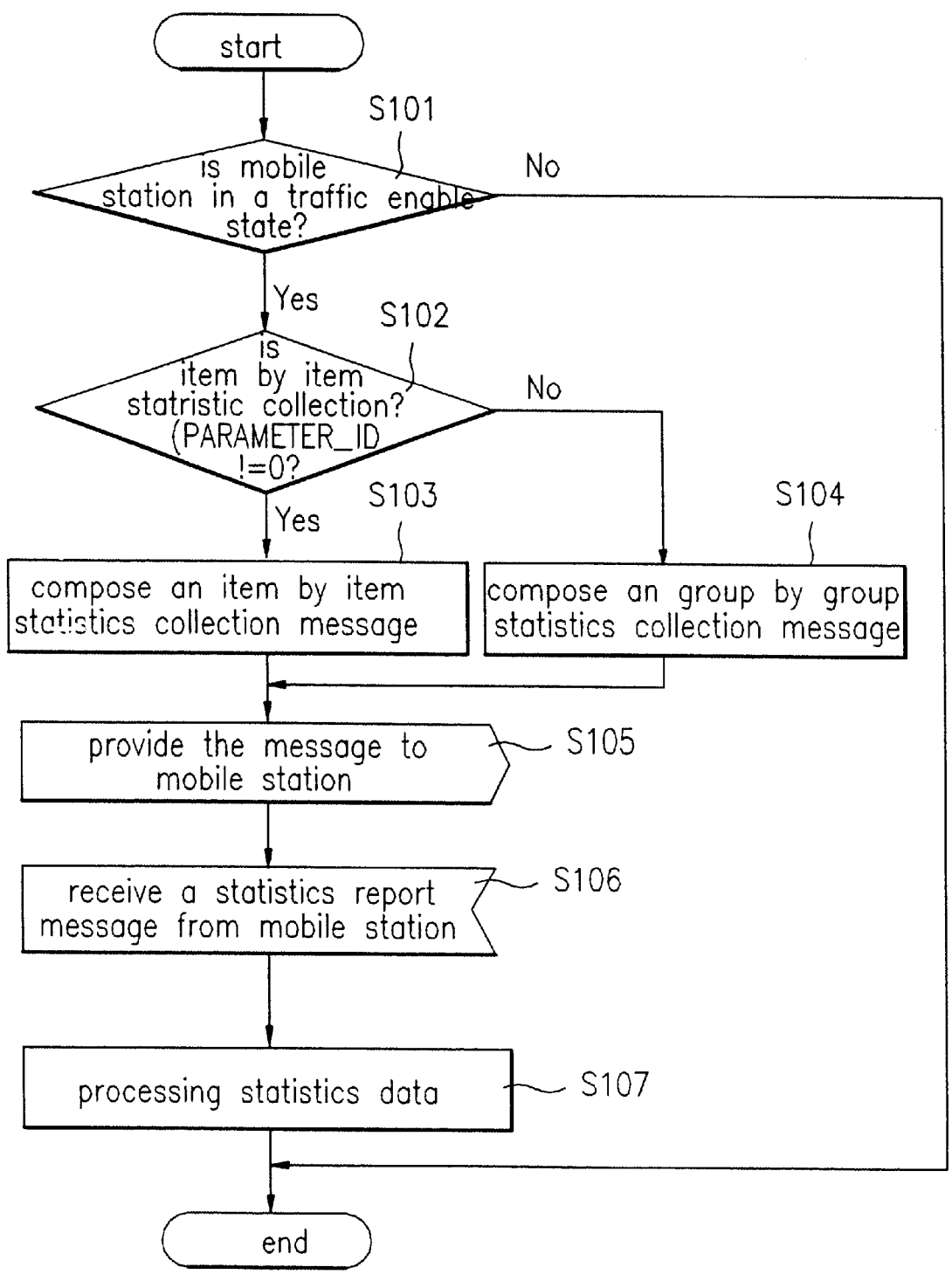
FIG. 2 illustrates a flow chart showing a process in which a base station collects a statistics data from a mobile station in accordance with a preferred embodiment of the present invention.
Figure 3:
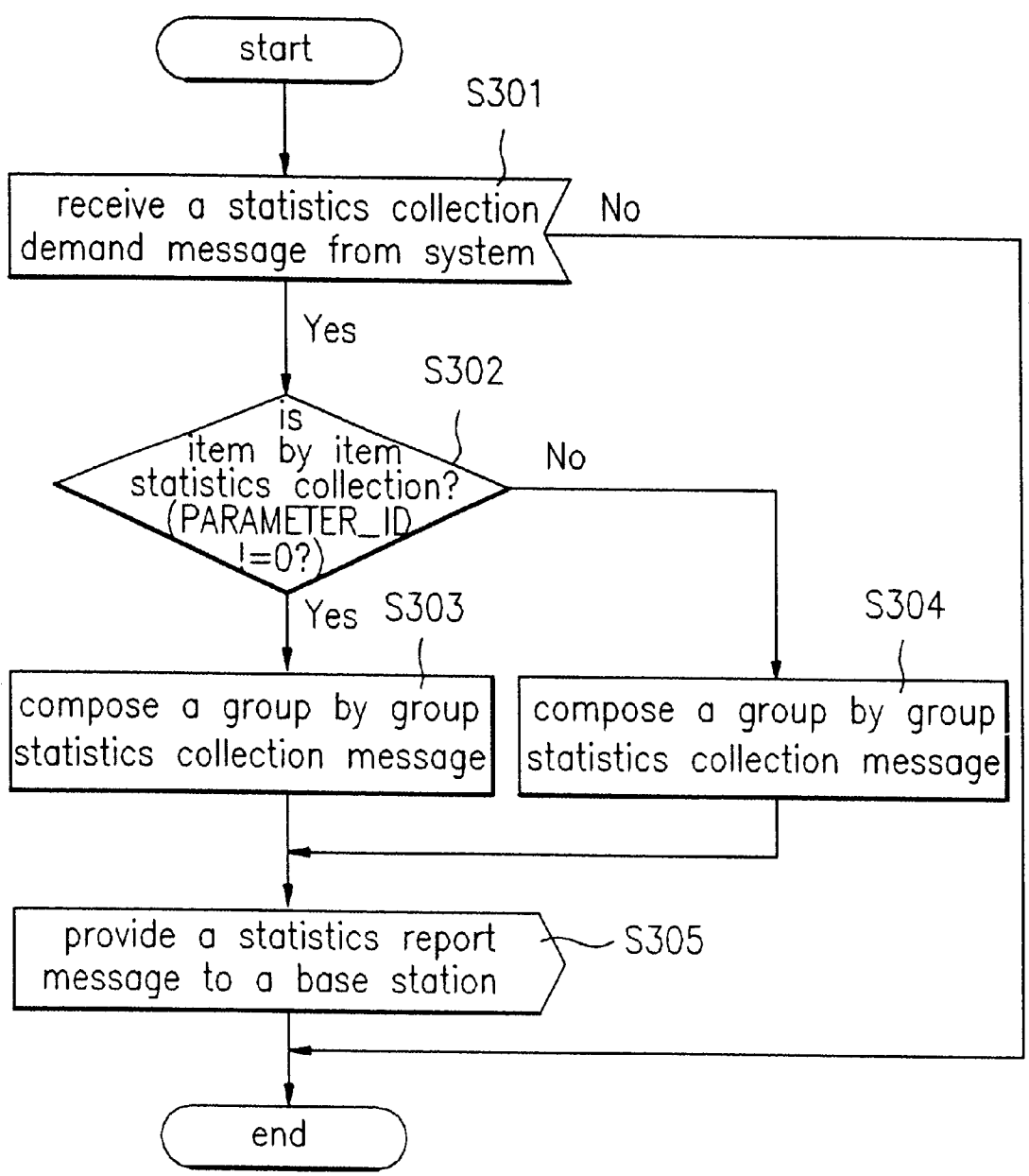
FIG. 3 illustrates a flow chart showing a process in which a statistics data is collected in a mobile station in accordance with a preferred embodiment of the present invention.
Figure 4:
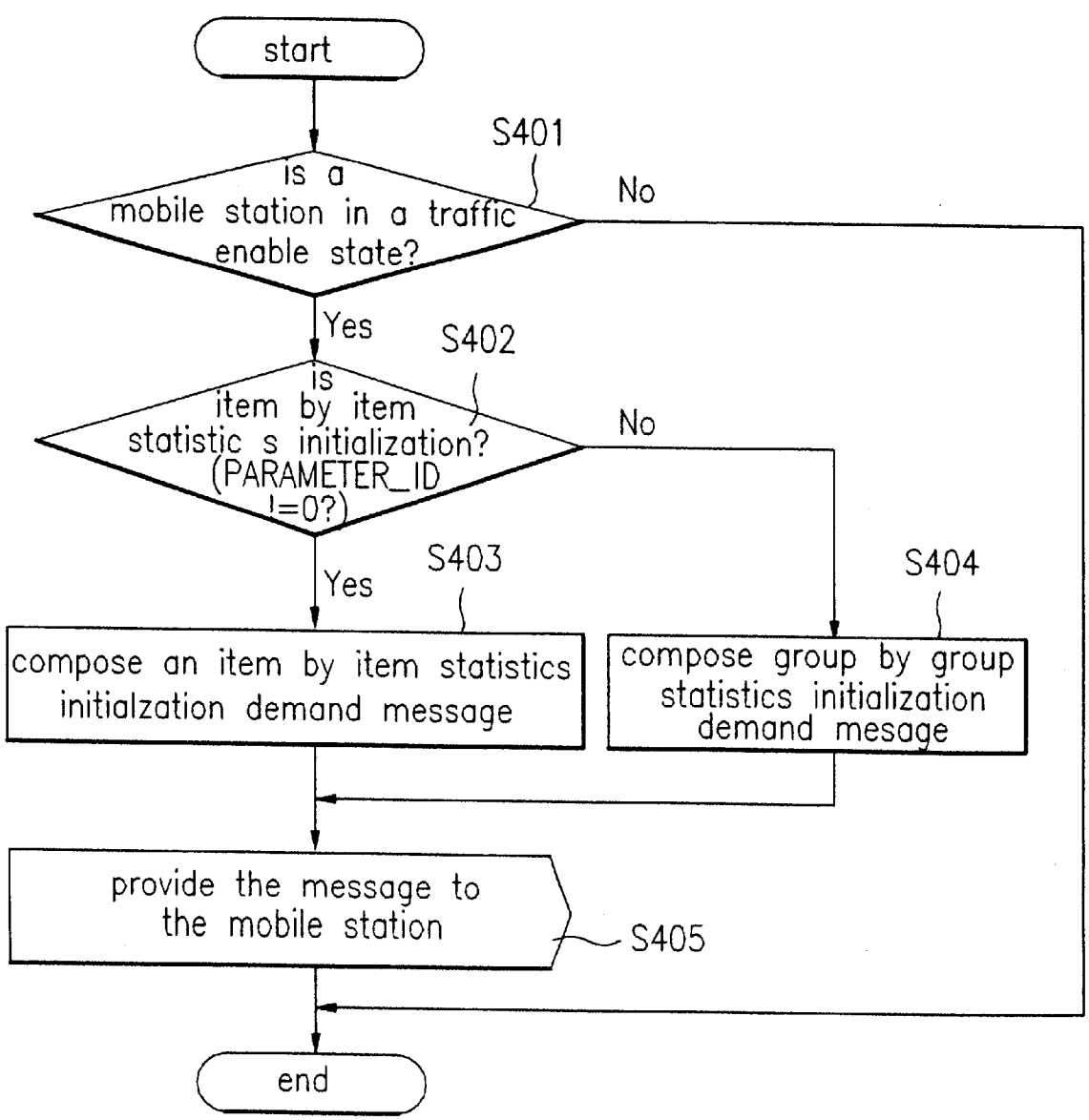
FIG. 4 illustrates a flow chart showing a process in which a base station initializes a statistics data in a mobile station in accordance with a preferred embodiment of the present intention; and, FIG. 5 illustrates a flow chart showing a process in which a statistics data is initialized in a mobile station in accordance with a preferred embodiment of the present invention.
Figure 5:
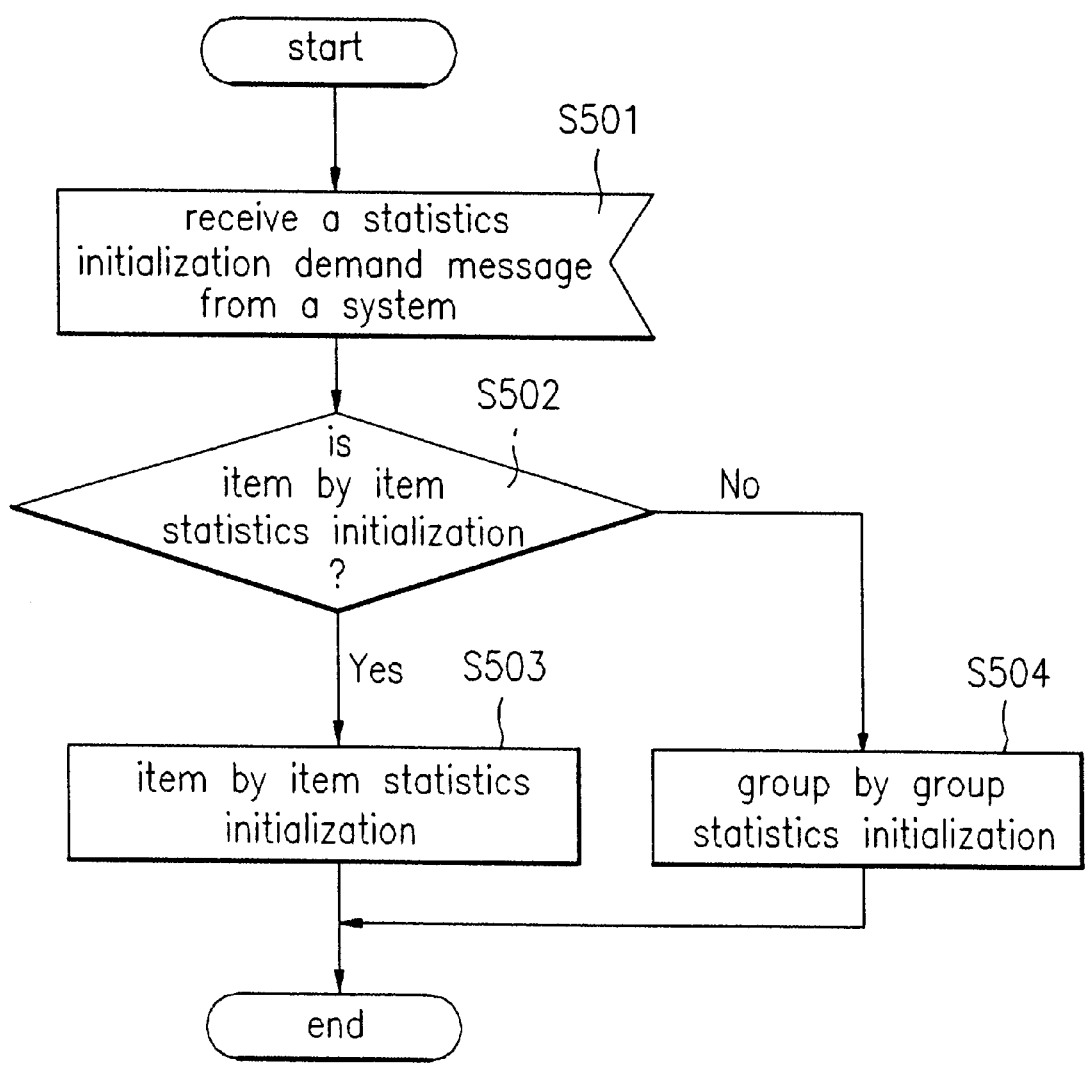

The method for processing a statistics data in accordance with a preferred embodiment of the present invention includes four subprocess. FIG. 2 illustrates a first subprocess in which the BS requests the statistics data from the mobile station 1 and processing the statistic data. FIG. 3 illustrates a second subprocess in which the mobile station 1 collects, and reports the statistic data according to the requests from the BS 10. FIG. 4 illustrates a third subprocess in which the BS 10 requests the mobile station 1 to initialize the statistics data accumulated therein. And, FIG. 5 illustrates a fourth subprocess in which the mobile station 1 initializes the statistic data according to the requests from the BS 10.

As explained, in collecting and initializing the items of the statistics data, the present invention classifies, and manages the items of the statistics data according to attributes and characteristics. Accordingly, as shown in FIG. 3, the items of the statistics data are classified into groups according to attributes and characteristics, and a parameter group identifier PARA_GROUP_ID is assigned to each classified group. Therefore, as shown in FIG. 1, when the selector/vocoder mobile 4 in the BSC 5 requests the statistic data from the mobile station 1 or initializes the statistics data accumulated in the mobile station 1, the selector/vocoder mobile 4 in the BSC 5 can collect or initialize the items of the statistics data in each group with easy by using the parameter group identifier PARA_GROUP_ID. The base station 10 provides the retrieve parameters message to the mobile station 1 when the BS 10 requests the mobile station 1 on the statistics data. In this instance, in order to provide a backward compatibility with TIA/EIA 95-B, the parameter identifier field(PARAMETER_ID) is used in the retrieve parameters message. The retrieve parameters message is a kind of forward traffic channel message and has a variable length type of message body format as shown in table 1a. The table 1a a shows fields of the retrieve parameters message and length of each field.

TABLE 1a

| Field | Length (bits) |
|---|---|
| MSG_TYPE('00001011') | 8 |
| ACK_SEQ | 3 |
| MSG_SEQ | 3 |
| ACK_REQ | 1 |
| ENCRYPTION | 2 |
| PARAMETER_ID | 16 |

That is, when the BSC 5 provides the retrieve parameters message for collecting the statistics data in the mobile station 1, a variable-length message format as shown in table 1a is used as the retrieve parameters message. And, if the parameters identifier field PARAMETER_ID in table 1a is '0000000000000000', the record also includes fields of tables 1b and 1c.

TABLE 1b

| NUM_OF_PARA_GRP_ID | 8 |
|---|---|

TABLE 1c

| PARA_GROUP_ID | 8 |
|---|---|

Since the field(NUM_OF_PARA_GRP_ID) in table 1b is a number of parameters group identification, a number of field(PARA_GROUP_ID) shown in table 1c as many as a number in the field(NUM_OF_PARA_ID) is generated. If the field(PARAMETER_ID) is not equal to '0000000000000000', the record also includes zero or more occurrences of fields as shown in tables 1d and 1e.

TABLE 1d

| PARAMETER_ID | 16 |
|---|---|

TABLE 1e

| RESERVED | 7 |
|---|---|

In tables 1a to 1e, the field(MSG_TYPE) is a message type. The base station shall set this field to "00001011". The field(ACK_SEQ) is an acknowledgement sequence number. The field(MSG_SEQ) is a message sequence number. The field(ACK_REQ) is a acknowledgement required indicator. The field(ENCRYPTION) is a message encryption indicator. The field(PARAMETER_ID) is a parameter identification. The base station can request the mobile station to report any parameter specified in the following table 4. The base station shall include one occurrence of this field for each parameter requested. The base station shall set this field to the parameter identification number specified in the following table 4 corresponding to the parameter requested. The field(NUM_OF_PARA_GRP_ID) is a number of requested parameter group identification in this message. The base station shall set this field to the number of occurrences of a field(PARA_GROUP_ID) in this message. The field(PARA_GROUP_ID) is a parameter group identification. The mobile station and the system have the parameter group specified in the following table 3. The base station shall include the above field (NUM_OF_PARA_GRP_ID) occurrences of this field for each parameter group requested. The base station shall set this field to the parameter group identification number specified in the following table 3 corresponding to the parameter group requested. The field(RESERVED) is reserved bits. The base station shall set this field to "0000000".

The set parameters message will be explained.

As explained, the base station may send a set parameters message to the mobile station in order to initiate statistics items requested. When the base station sends the set parameter message, it shall use a variable length message format as shown in table 2a. Table 2a shows a body format of the set parameters message.

TABLE 2a

| Field | Length (bits) |
|---|---|
| MSG_TYPE('00001100') | 8 |
| ACK_SEQ | 3 |
| MSG_SEQ | 3 |
| ACK_REQ | 1 |
| ENCRYPTION | 2 |
| PARAMETER_ID | 16 |

When the BSC 5 in FIG. 1 provides the set parameters message to the mobile station 1 for initializing the statistics data accumulated in the mobile station 1, the message has a variable length type of message format as shown in Table 2a. If the field(PARAMETER_ID) in table 2a is "0000000000000000", the record also includes fields of table 2b and table 2c.

TABLE 2b

| NUM_OF_PARA_GRP_ID | 8 |
|---|---|

The field(NUM_OF_PARA_GRP_ID) in table 2b generates the fields in table 2c.

TABLE 2c

| PARA_GROUP_ID | 8 |
|---|---|
| PARA_GROUP_LEN | 10 |
| GROUP_PARAMETER | PARA_GROUP_LEN+1 |

The number of the field(NUM_OF_PARA_GRP_ID) of table 2b corresponds to occurrences of the fields of table 2c. On the other hand, if the field(PARAMETER_ID) in table 2a is not "0000000000000000", the record also includes fields of tables 2d, 2e and 2f, below.

TABLE 2d

| PARAMETER_LEN | 10 |
|---|---|
| PARAMETER | PARAMETER_LEN+1 |

TABLE 2e

| PARAMETER_ID | 16 |
|---|---|
| PARAMETER_LEN | 10 |
| PARAMETER | PARAMETER_LEN+1 |

TABLE 2f

| RESERVED | 0–7 |
|---|---|

The fields of table 2e may be zero or more occurrences. In table 2a to 2f, the field (MSG_TYPE) is a message type. The base station shall set this field to "00001100". The field (ACK_SEQ) is an acknowledgement sequence number. The field(MSG_SEQ) is a message sequence number. The field (ACK_REQ) is an acknowledgement required indicator. The field (ENCRYPTION) is a message encryption indicator. The field(PARAMETER_ID) is a parameter identification. The base station shall set this field to the identification shown in table 4 corresponding to the set table parameter to be set. The field(NUM_OF_PARA_GRP_ID) is a number of requested parameter group identification in this message. The base station shall set this field to the number of occurrences of parameter group identification in this message. The field(PARA_GROUP_ID) is a parameter group identification. The base station can request the mobile station to report any parameter group specified in the following table 3. The base station shall includes the field(NUM_OF_PARA_GRP_ID) occurrences of this field for each parameter group requested. The base station shall set this field to the parameter group identification number specified in the following table 3 corresponding to the parameter group requested. The field(PARA_GROUP_LEN) is a parameter group length. The base station shall set this field to the length shown in the following table 3 corresponding to the parameter group to be set. The field(GROUP_PARAMETER) is a parameter value. The base station shall set this field to the value of the parameter group specified by the field(PARA_GROUP_ID). The field (PARAMETER_LEN) is a parameter length. The base station shall set this to the length shown in table 4 corresponding to the parameter to be set. The field(PARAMETER) is a parameter value. The base station shall set this field to the value of the parameter specified by the field (PARAMETER_ID). The field (RESERVED) is reserved bits. The base station shall add reserved bits as needed in order to make the length of the entire message equal to an integer number of octets. The base station shall set these bits to "0".

As explained, the present invention permits collection or initialization of statistic items either in groups or item by item the same as in the related art. In the case when the statistics items are processed according to the related art, as shown in tables 1a, 1d, and 1e, and table 2a, 2d, and 2f existing identical fields are provided from the mobile station 1 without any change on the forward traffic channel message format. The table 3 shows groups of retrievable and set table parameters. The table 4 shows retrievable and settable parameters.

TABLE 3

| Parameter group identifier | Value of PARA_GROUP_ID (decimal) | Length (bits) (PARA_GROUP_LEN is length −1) |
|---|---|---|
| MUX_REV | 1 | 24 |
| MUX1_FOR | 2 | 24 |
| PAG | 3 | 16 |
| ACC | 4 | 16 |
| LAYER2_RTC | 5 | 16 |
| OTHERS_SYS_TIME | 6 | 36 |
| MUX2_REV | 7 | 24 |
| MUX2_FOR | 8 | 24 |
| SUPP_REV | 9 | 24 |
| SUPP_FOR | 10 | 24 |

TABLE 4

| Parameter identifier | Value of PARAMETER_ID (decimal) | Length (bits) (PARAMETER_LEN is length −1) |
|---|---|---|
| PARA_GROUP | 0 | 24 |
| MUX1_REV_1 | 1 | 24 |
| MUX1_REV_1 | 2 | 16 |
| MUX1_REV_1 | 3 | 16 |
| . | . | . |
| . | . | . |
| | 129 | 24 |

The subprocesses in accordance with a preferred embodiment of the present invention will be explained with reference to FIGS. 2–5. FIG. 2 Illustrates a flow chart showing a process in which a base station(or a system) requests to collect a statistics data from a mobile station in accordance with a preferred embodiment of the present invention, and FIG. 4 illustrates a flow chart showing a process in which a mobile station collects a statistics data and reports to the system.

Referring to FIG. 2, the selector/vocoder mobile 4 determines the traffic channel of being in a traffic enable state. (S201). As a result of the step(S201), if the traffic channel is not in the traffic enable state, the process is stopped. However, if the traffic channel is in the traffic enable state, a statistics data to request the mobile station 1 to collect is determined. That is, requesting either item by item or group by group collection of the statistics data is determined. (S202). As a result of the determination in the step S202, if it is determined that the request is item by item statistics data collection, i.e., if the field(PARAMETER_ID) is "0000000000000000", the system composes the retrieve parameters message using tables 1a, 1d, and 1e.(S203). Opposite to this, as the result of the determination in the step S202, if it is determined that the request is group by group statistics data collection, i.e., the field(PARAMETER_ID) is not "0000000000000000", the system composes the retrieve parameters message, the statistics data collection message, using tables 1a, 1b, and 1c. In this instance, as explained, the system composes the retrieve parameters message, the group by group statistics collection message, using two fields (PARA_GROUP_ID, NUM_OF_PARA_GRP_ID), newly.(S204). In this step S204, the field (PARAMETER_ID) having a value "0000000000000000" is included, for securing a backward compatibility with the existing IS-95 family. In the IS-95, as explained, since fields (PARAMFTER_ID) having values from 1 to 129 are already used, "0" is assigned as a value of the field (PARAMETER_ID) which represents the field (PARAMETER_GROUP_ID). The following tables 5 and 6 show an example of a group statistics request message. Table 5 illustrates fields contained in item by item statistics collection requesting messages which do not use the fields (NUM_OF_PARA_GRP_ID and PARA_GRP_ID). On the other hand, table 6 illustrates fields contained in group by group statistics collection requesting messages which use the fields(NUM_OF_PARA_GRP_ID).

TABLE 5

| field | length | value |
|---|---|---|
| MSG_TYPE | 8 | 11 |
| ACK_SEQ | 3 | 7 |
| MSG_SEQ | 3 | 1 |
| ACK_REQ | 1 | 1 |
| ENCRYPTION | 2 | 0 |
| PARAMETER_ID | 16 | 76 |
| PARAMETER_ID | 16 | 77 |
| PARAMETER_ID | 16 | 78 |
| PARAMETER_ID | 16 | 79 |
| PARAMETER_ID | 16 | 80 |
| PARAMETER_ID | 16 | 81 |
| PARAMETER_ID | 16 | 82 |
| PARAMETER_ID | 16 | 83 |
| PARAMETER_ID | 16 | 84 |
| PARAMETER_ID | 16 | 85 |
| PARAMETER_ID | 16 | 86 |
| PARAMETER_ID | 16 | 87 |
| PARAMETER_ID | 16 | 88 |
| PARAMETER_ID | 16 | 89 |
| PARAMETER_ID | 16 | 90 |
| PARAMETER_ID | 16 | 91 |
| PARAMETER_ID | 16 | 92 |
| PARAMETER_ID | 16 | 93 |

TABLE 5-continued

| field | length | value |
|---|---|---|
| PARAMETER_ID | 16 | 94 |
| PARAMETER_ID | 16 | 95 |
| PARAMETER_ID | 16 | 96 |
| PARAMETER_ID | 16 | 97 |
| PARAMETER_ID | 16 | 98 |
| PARAMETER_ID | 16 | 99 |
| PARAMETER_ID | 16 | 100 |
| PARAMETER_ID | 16 | 101 |

TABLE 6

| field | length (bits) | value |
|---|---|---|
| MSG_TYPE | 8 | 11 |
| ACK_SEQ | 3 | 7 |
| MSG_SEQ | 3 | 1 |
| ACK_REQ | 1 | 1 |
| ENCRYPTION | 2 | 0 |
| PARAMETER_ID | 16 | 0 (indicate PARA GROUP) |
| NUM_OF_PARA_GRP_ID | 8 | 1 (indicate 1 group) |
| PARA_GROUP_ID | 8 | 8 (MUX 2 FOUR) |

As shown in tables 5 and 6, the retrieve parameters message for requesting group by group statistics collection is substantially shorter, and simpler than the retrieve parameters message for requesting item by item statistics collection. In the system, the statistics items are classified into groups based on characteristics and attributes. And, in composition of the retrieve parameters message, a value corresponding to a group or an item ("0" or a value which is not "0") is assigned to a first field(PARAMETER_ID). Then, the selector/vocoder mobile 4 in the BSC 5 provides the retrieve parameters message to the traffic channel 2 in the base station.(S205). Then, the traffic channel 2 provides the retrieve parameters message to the mobile station 1, in turn. Upon reception of a report parameters message including the statistics data responsive to the retrieve parameters message from the mobile station 1(S206), the system(or the base station) processes the statistics data according to the report parameters message.(S207).

In the meantime, referring to FIG. 3, the mobile station 1 receives the retrieve parameters message, an item by item or group by group statistics collection request message the traffic channel 2 in the BTS 3 provided thereto.(S301). The mobile station 1 is then analyzes the retrieve parameters message, to determine the retrieve parameters message to being an item by item or group by group data collection requesting message(S302). That is, if a value of the first field(PARAMETER_ID) in the retrieve parameters message is "0", the retrieve parameters message is determined to be the group by group data collection requesting message, and, if the value is not "0", the retrieve parameters message is determined to be the item by item data collection requesting message. As a result of the step S302, if the retrieve parameters message is determined to be the item by item data collection requesting message, the mobile station collects the accumulated statistics data item by item(S303), and, as the result of the step S302, if the retrieve parameters message is determined to be the group by group data collection requesting message, the mobile station collects the accumulated statistics data group by group(S304). Then, the mobile station 1 shown in FIG. 1 reports a statistics collection message (or report parameters message) composed in the steps S303 or 304 to the traffic channel 2 in the base station.(S305).

FIG. 4 illustrates a flow chart showing a process in which a base station initializes a statistics data in a mobile station in accordance with a preferred embodiment of the present invention.

Referring to FIG. 4, first, the selector/vocoder mobile 4 in the BSC 5 determines the traffic channel 2 in the base station of being in a traffic enable states.(S401). As a result of the determination in the step S401, if the traffic channel 2 is not in the traffic enable states, the BSC 5 ends this subprocess. Opposite to this, as a result of the determination in the step S401, if the traffic channel 2 is in the traffic enable states, the BSC 5 determines kinds of initialization requesting message (or set parameters message) to be provided to the mobile station 1.(S402). As a result of the step S402, if it is determined that the statistics data accumulated in the mobile station 1 is to be initialized item by item, the base station composes a set parameters message, a message for initializing the accumulated statistics data item by item, using the fields shown in tables 2a, 2d, 2e, and 2f.(S403). Opposite to this, as a result of the step S402, if it is determined that the statistics data accumulated in the mobile station 1 is to be initialized group by group, the base station composes a set parameters message, a message for initializing the accumulated statistics data group by group, using the fields(PARA_GROUP_ID, NUM _OF_PARA_GRP_ID, PARA_GROUP_LEN, GROUP_PARAMETER) shown in tables 2a, 2b, and 2c.(S404). Then, the selector/vocoder mobile 4 in the BSC 5 provides the set parameters message of group by group or item by item statistics initialization message composed in the step S403 or S404 to the traffic channel 2 in the base transceiver subsystem 3.(S405). Then, the traffic channel 2 provides the set parameters message to the mobile station 1.

FIG. 5 illustrates a flow chart showing a subprocess in which the mobile station 1 initializes a statistics data accumulated in itself in response to the request from the base station in accordance with a preferred embodiment of the present invention.

Referring to FIG. 5, the mobile station 1 receives the set parameters message of an item by item or group by group data initialization requesting message provided from the traffic channel 2 in the BTS 3.(S501). Then, the mobile station 1 analyzes the received set parameters message, to determine the set parameters message of being an item by item or group by group accumulated statistics data initialization message.(S502). That is, the mobile station 1 determines whether the first field(PARAMETER_ID) is "0" or not. As a result of the determination in the step S502, if the set parameters message is an item by item accumulated statistics data initialization message, i.e., if the first field (PARAMETER_ID) is not "0", the base station initializes the statistics data accumulated in the mobile station 1 item by item.(S503). Opposite to this, as the result of the determination in the step S502, if the set parameters message is a group by group accumulated statistics data initialization message, the base station initializes the statistics data accumulated in the mobile station 1 group by group.(S504).

In the method for processing a statistics data in a mobile station in a mobile communication system of the present invention, the system is operative with reference to the field(PARA_GROUP_ID) which is the items of the statistics data grouped by characteristics and attributes. For example, as shown in table 5, if it is intended to collect a statistics data of a forward fundamental code channel for multiplex option 2 from the mobile station 1, the statistics data(i.e., PARAMETER_ID) has 26 items in total each with 16 bits. Therefore, in the related art method, total 433 bits are required for composing the retrieve parameters message or set parameters message. On the other hand, an example of application of the case to the present invention is shown in table 6. In the table 6, the field(PARA_GROUP_ID) has 8 bits. And, the first field(PARAMETER_ID) is set to "0" which requests a group by group collection or initialization of the statistics data. The field(NUM_OF_PARA_GRP_ID), representing a number of the statistics groups and contained in the retrieve parameters message or the set parameters message, is set to "1". Therefore, as shown in table 6, the retrieve parameters message or the set parameters message can be composed of merely 49 bits (i.e., 7 bytes). Therefore, in comparison to the 433 bits (i.e., 55 bytes) shown in table 5 of the related art application, the 49 bits shown in table 6 of the present invention application is approx. 8 times message length reduction. And, in the case when the statistics data of forward fundamental code channel for multiplex option 2 is initialized, the method of the present invention requires total 83 bits (i.e., 11 bytes) for composing the set parameters message. However, the related art method requires total 1317 bits (i.e., 165 bytes) for composing the set parameters message. Therefore, the method of the present invention allows approx. 15 time message length reduction.

The method for processing a statistics data in a mobile station in a mobile communication system of the present invention as explained has the following advantages.

First, the collection or initialization of a statistics data accumulated in the mobile station can be conducted item by item (PARAMETER_ID) as the related art or group by group as the present invention, which allows to have a backward compatibility with the existing IS-95 family.

Second, the grouping of statistics items by characteristics and attributes allows one message to contain many of the field(PARA_GROUP_ID), allowing transmission of many groups of statistics items in transmission of one message. That is, sizes of messages transmitted through a traffic channel signal path as well as blank-and-burst/dim-burst occurrences can be reduced. Moreover, even if a message for retrieving or setting a large amount of statistics data is transmitted through a traffic channel, it does not affect to a quality of voice signal on the channel.

Third, the reduced amount of data contained in the message necessitates less amount of data processing, that reduces a processing load on a processor.

Fourth, the reduction of an "on air" data transmission amount from the BTS caused by the reduction of data contained in the message allows an efficient network transmission.

It will be apparent to those skilled in the art that various modifications and variations can be made in the method for processing a statistics data in a mobile station in a mobile communication system of the present invention without departing from the spirit or scope of the invention. Thus, it is intended that the present invention cover the modifications and variations of this invention provided they come within the scope of the appended claims and their equivalents.

What is claimed is:

1. A method for processing a statistics data in a mobile station in a mobile communication system, comprising:

(1) a base station checking a presence of request for processing the statistic data accumulated in the mobile station;

(2) if the request present, the base station classifying items of the statistics data into groups by attributes and characteristics, and composing a request message for processing the statistics data using the groups; and, (3) providing the composed request message from the base station to the mobile station, wherein the request message is a retrieve parameters message for collecting a statistics data on a forward fundamental code channel for multiplex option 2 from the mobile station.

2. A method as claimed in claim 1, further comprising:

the mobile station receiving the request message from the base station;

the mobile station conducting the request on the statistics data according to the request message and providing a responsive message to the base station; and, the base station receiving, and processing the responsive message.

3. A method as claimed in claim 1, wherein the request message is either a retrieve parameters message for collecting the statistics data in the mobile station or a set parameters message for initializing the statistics data in the mobile station.

4. A method as claimed in claim 3, wherein the retrieve parameters message includes;

a parameter identification field(PARAMETER_ID) with a length of 16 bits and a value "0", a number of parameter group identification field(NUM_OF_PARA_ID) with a length of 8 bits, and a parameter group identification field(PARA_GROUP_ID) with a length of 8 bits and the number of this field(PARA_GROUP_ID) being the same as the number of the field(NUM_OF_PARA_GRP_ID).

5. A method as claimed in claim 3, wherein the set parameters message includes;

a parameter identification field(PARAMETER_ID) with a length of 16 bits and a value "0", a number of parameter group identification field(NUM_OF_PARA_ID) with a length of 8 bits, a parameter group identification field(PARA_GROUP_ID) with a length of 8 bits and the number of this field(PARA_GROUP_ID) being the same as the number of the field(NUM_OF_PARA_GRP_ID), a number of parameter group identification field(NUM_OF_PARA_GRP_ID) with a length of 8 bits, a parameter group identification field(PARA_GROUP_ID) with a length of 8 bits, a parameter group length with a length of 10 bits, and a group parameter field(GROUP_PARAMETER) with a length of "the length of the field (PARA_GROUP_LEN)+1".

6. A method as claimed in claim 1, wherein the retrieve parameters message includes;

a message type field(MSG_TYPE) with a length of 8 bits and a value of "11", a acknowledgement sequence field(ACK_SEQ) with a length of 3 bits and a value of "7", a message sequence field(MSG_SEQ) with a length of 3 bits and a value of "1", an acknowledgement request field(ACK_REQ) with a length of 1 bit and a value of "1", an encryption field(ENCRYPTION) with a length of 2 bits and a value of "0", a parameter identification field(PARAMETER_ID) with a length of 16 bits and a value of "0", indicating an existence of one parameter group, a number of parameter group identification field(NUM_OF_PARA_GRP_ID) with a length of 8 bits and a value of "1", indicating one group, and a parameter group identification field(PARA_GROUP_ID) with a length of 8 bits and a value of "8".

7. A method as claimed in claim 1, wherein the request message is transmitted from the base station to the traffic channel, and, in turn, from the traffic channel to the mobile station.

8. A method for processing a statistics data in a mobile station in a mobile communication system, comprising:

(1) a mobile station checking a presence of request for processing the statistic data accumulated in the mobile station from a base station;

(2) if the request present, determining the request of being an item by item processing request using a parameter identification field(PARAMETER_ID) or a group by group processing request using a parameter group identification field (PARA_GROUP_ID);

(3) according to a result of the determination in the step (1), classifying field (PARAMETER_ID) of items of the statistics data into groups by attributes and characteristics and assigning the field(PARA_GROUP_ID) to each pertinent group if the request is a group by group processing request, and leaving the field (PARAMETER_ID) as they are if the request is an item by item processing request; and, (4) according to a result of step (3), composing a group by group or item by item statistics data processing request message and providing the request message to the mobile station, wherein the request message is a retrieve parameters message for collecting a statistics data on a forward fundamental code channel for multiplex option 2 from the mobile station.

9. A method as claimed in claim 8, wherein the request message is transmitted from a base station to a traffic channel, and, in turn, from the traffic channel to the mobile station.

10. A method as claimed in claim 8, further comprising:

(a1) the mobile station receiving the request message from the base station;

(a2) the mobile station determining the request message of being a group by group or item by item statistics data processing request;

(a3) conducting the group by group or item by item statistics data processing request according to the determination in the step a2, and providing a response parameters message to the base station; and, (a4) the base station receiving the response parameters message and processing the received message.

11. A method as claimed in claim 8, wherein the request message is either a retrieve parameters message for collecting the statistics data in the mobile station or a set parameters message for initializing the statistics data in the mobile station.

12. A method as claimed in claim 8, wherein the retrieve parameters message includes;

a parameter identification field(PARAMETER_ID) with a length of 16 bits and a value "0", a number of parameter group identification field(NUM_OF_PARA_ID) with a length of 8 bits, and a parameter group identification field(PARA_GROUP_ID) with a length of 8 bits and the number of this field(PAPA_GROUP_ID) being the same as the number of the field(NUM_OF_PARA_GRP_ID).

13. A method as claimed in claim 11, wherein the set parameters message includes;
   a parameter identification field(PARAMETER_ID) with a length of 16 bits and a value "0",
   a number of parameter group identification field(NUM_OF_PARA_ID) with a length of 8 bits,
   a parameter group identification field(PARA_GROUP_ID) with a length of 8 bits and the number of this field(PARA_GROUP_ID) being the same as the number of the field(NUM_OF_PARA_GRP_ID),
   a number of parameter group identification field(NUM_OF_PARA_GRP_ID) with a length of 8 bits,
   a parameter group identification field(PARA_GROUP_ID) with a length of 8 bits,
   a parameter group length with a length of 10 bits, and
   a group parameter field(GROUP_PARAMETER) with a length of "the length of the field (PARA_GROUP_LEN)+1".

14. A method as claimed in claim 8, wherein the retrieve parameters message includes;
   a message type field(MSG_TYPE) with a length of 8 bits and a value of "11",
   a acknowledgement sequence field(ACK_SEQ) with a length of 3 bits and a value of "7",
   a message sequence field(MSG_SEQ) with a length of 3 bits and a value of "1",
   an acknowledgement request field(ACK_REQ) with a length of 1 bit and a value of "1",
   an encryption field(ENCRYPTION) with a length of 2 bits and a value of "0",
   a parameter identification field(PARAMETER_ID) with a length of 16 bits and a value of "0", indicating an existence of one parameter group,
   a number of parameter group identification field(NUM_OF_PARA_GRP_ID) with a length of 8 bits and a value of "1", indicating one group, and
   a parameter group identification field(PARA_GROUP_ID) with a length of 8 bits and a value of "8".

15. A method for a mobile station in a mobile communication system to process a message, comprising:
   (1) the mobile station receiving a request message for processing a statistics data accumulated in the mobile station from a base station;
   (2) analyzing the request message, to check presence of a parameter identification field(PARAMETER_ID) with a value of "0", a number of parameter group identification field(NUM_OF_PARA_GRP_ID), and a parameter group identification field(PARA_GROUP_ID) in the request message;
   (3) processing the statistics data group by group according to the request message using fields if the fields present in the step (2), and, if the fields are not present, processing the statistics data item by item; and,
   (4) transmitting a response parameters message corresponding to a result of the processing to the base station, wherein the request message is a retrieve parameters message for collecting a statistics data on a forward fundamental code channel for multiplex option 2 from the mobile station.

16. A method as claimed in claim 15, wherein the request message is either a retrieve parameters message for collecting the statistics data in the mobile station or a set parameters message for initializing the statistics data in the mobile station.

17. A method for processing a statistics data in a mobile station in a mobile communication system, comprising:
   (1) a mobile station checking a presence of request for processing the statistic data accumulated in the mobile station from a base station;
   (2) if the request present, determining the request of being an item by item processing request using a parameter identification field(PARAMETER_ID) or a group by group processing request using a parameter group identification field (PARA_GROUP_ID);
   (3) according to a result of the determination in the step (1), classifying field (PARAMETER_ID) of items of the statistics data into groups by attributes and characteristics and assigning the field(PARA_GROUP_ID) to each pertinent group if the request is a group by group processing request, and leaving the field (PARAMETER_ID) as they are if the request is an item by item processing request; and,
   (4) according to a result of step (3), composing a group by group or item by item statistics data processing request message and providing the request message to the mobile station, wherein the retrieve parameters message includes;
   a parameter identification field(PARAMETER_ID) with a length of 16 bits and a value "0",
   a number of parameter group identification field (NUM_OF_PARA_ID) with a length of 8 bits, and
   a parameter group identification field(PARA_GROUP_ID) with a length of 8 bits and the number of this field(PARA_GROUP_ID) being the same as the number of the field(NUM_OF_PARA_GRP_ID).

* * * * *